US009400042B2

(12) United States Patent
Dwenger et al.

(10) Patent No.: US 9,400,042 B2
(45) Date of Patent: Jul. 26, 2016

(54) TWO MODE CONTINUOUSLY VARIABLE TRANSMISSION

(71) Applicant: GM Global Technology Operations LLC, Detroit, MI (US)

(72) Inventors: Douglas John Dwenger, Plymouth, MI (US); Edward W. Mellet, Rochester Hills, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 14/521,644

(22) Filed: Oct. 23, 2014

(65) Prior Publication Data

US 2016/0116034 A1 Apr. 28, 2016

(51) Int. Cl.

| | |
|---|---|
| ***F16H 3/48*** | (2006.01) |
| ***F16H 37/02*** | (2006.01) |
| ***F16H 3/62*** | (2006.01) |
| ***F16H 3/66*** | (2006.01) |
| ***F16H 9/26*** | (2006.01) |
| *F16H 3/44* | (2006.01) |

(52) U.S. Cl.

CPC ................ *F16H 37/022* (2013.01); *F16H 3/48* (2013.01); *F16H 3/62* (2013.01); *F16H 3/663* (2013.01); *F16H 9/26* (2013.01); *F16H 2003/442* (2013.01); *F16H 2200/2023* (2013.01); *F16H 2200/2038* (2013.01)

(58) Field of Classification Search

None

See application file for complete search history.

(56) References Cited

U.S. PATENT DOCUMENTS

| | | | | |
|---|---|---|---|---|
| 4,793,217 | A * | 12/1988 | Morisawa ............. | B60W 10/06 477/41 |
| 8,620,539 | B2 | 12/2013 | Urata et al. | |
| 2008/0261766 | A1* | 10/2008 | Koyama ................ | F16H 37/022 475/280 |
| 2015/0011350 | A1* | 1/2015 | Mellet ................... | F16H 37/022 475/213 |

* cited by examiner

*Primary Examiner* — Justin Holmes

(57) ABSTRACT

A two mode continuously variable transmission (CVT) for a motor vehicle includes an optional speed change device connected to a pulley and a belt assembly or other continuously variable unit. The pulley and belt assembly is also connected to a gear box having a planetary gear assembly. The gear box has two brakes and a clutch. The gear set arrangement is connected to a final drive unit. Selective engagement of the clutch and brakes provides two modes of operation to the CVT.

15 Claims, 2 Drawing Sheets

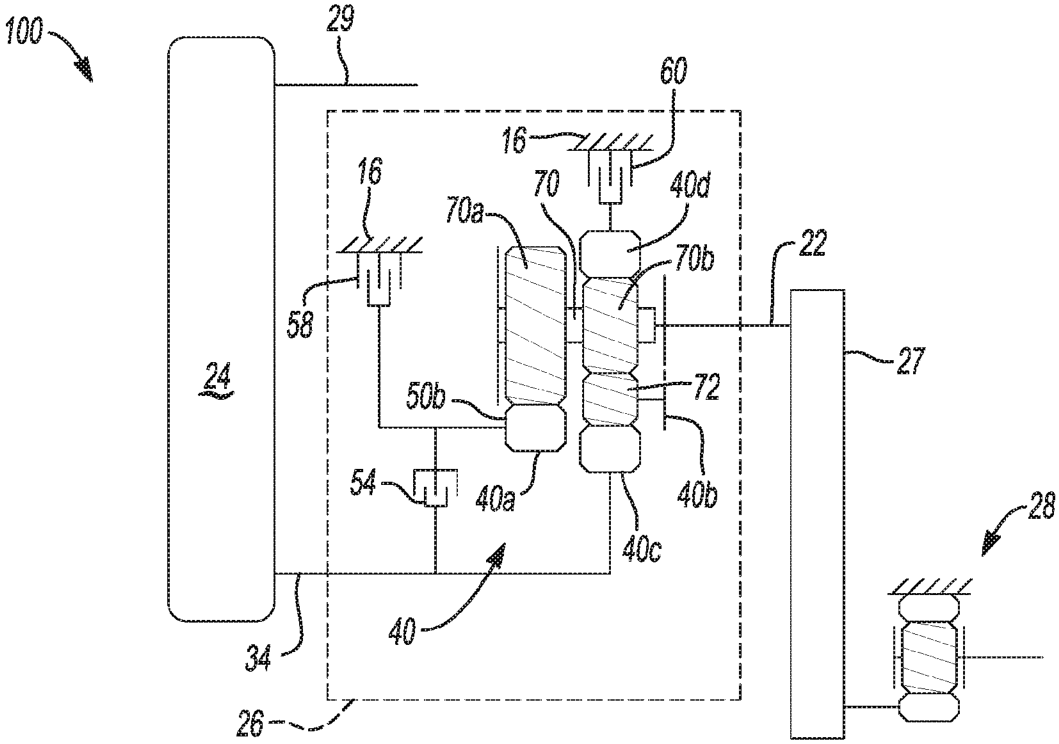
IFig-3

TWO MODE CONTINUOUSLY VARIABLE TRANSMISSION

FIELD

The present disclosure relates to an automatic transmission and more particularly to a two mode continuously variable transmission for a front or rear wheel drive motor vehicle and a method of changing from one mode to the other mode.

BACKGROUND

The statements in this section merely provide background information related to the present disclosure and may or may not constitute prior art.

A continuously variable transmission ("CVT") typically includes a belt and pulley system that operatively couples a rotary power source, such as an engine or electric motor, to a final drive unit. The belt and pulley system generally includes first and second pairs of pulley cones having a torque transmitting belt or chain extending between the cone pairs. Each pulley cone pair includes an axially stationary pulley member and an axially movable pulley member. Each movable pulley member is axially adjustable with respect to the stationary pulley member by a hydraulic system. The hydraulic system provides primary and secondary hydraulic pressures to the respective movable pulley members to adjust the running radius of the first and second pulley cone pairs which in turn controls the output/input ratio of the continuously variable transmission. Movement of the cones steplessly or continuously varies the ratio of an input speed to an output speed. With the continuously variable transmission, small but effective ratio changes can be attained. This is in contrast to a fixed gear ratio unit where any ratio changes are step values.

While these CVT's are effective they are limited to an overall speed ratio of approximately 7. Higher overall speed ratios require larger pulleys which negatively affect the CVT mass, efficiency, and cost. Accordingly, there is a constant need for improved CVT designs that minimize axial length and mass while providing sufficient performance characteristics including an increased overall speed ratio.

SUMMARY

A two mode CVT is provided for a motor vehicle. The two mode CVT includes an optional speed change device connected to a pulley and a belt assembly. The pulley and belt assembly is also connected to a planetary gear assembly, two brakes and one clutch. The planetary gear assembly is connected to a final drive unit.

In one example, a continuously variable transmission includes a housing, an input member, an output member, a continuously variable unit connected with the input member, and a gearbox connected to the continuously variable unit and to the output member. The gearbox has a planetary gear assembly having a forward sun gear, a rearward sun gear, a set of stepped planetary gears, a set of non-stepped planetary gears, a common carrier supporting the planetary gears, and a common ring gear. The gearbox also includes a first torque transmitting mechanism located between the continuously variable unit and the forward sun gear and selectively connecting the forward sun gear to the rearward sun gear. The gearbox also includes a second torque transmitting mechanism selectively connecting the rearward sun gear to the housing. Selective engagement of the first torque transmitting mechanism and the second torque transmitting mechanism provides a high speed mode and a low speed mode of operation to the continuously variable transmission.

In another example, a third torque transmitting mechanism selectively connecting the ring gear to the housing is included. Selective engagement of the third torque mechanism provides a reverse mode of operation.

In yet another example, the first torque transmitting mechanism is a clutch.

In yet another example, the second torque transmitting mechanism is a brake.

In yet another example, the third torque transmitting mechanism is a brake.

In yet another example, the high speed mode is achieved by engaging the first torque transmitting mechanism and not engaging the second torque transmitting mechanism.

In yet another example, the low speed mode is achieved by not engaging the first torque transmitting mechanism and engaging the second torque transmitting mechanism.

In yet another example, the reverse mode is achieved by engaging the third torque transmitting mechanism, not engaging the first torque transmitting mechanism and not engaging the second torque transmitting mechanism.

In yet another example, the planetary gear assembly is a Ravigneaux gear.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 3 is an illustration of a gearbox of a transmission according to the principles of the present invention.

DETAILED DESCRIPTION

The following description is merely exemplary in nature and is not intended to limit the present disclosure, application, or uses.

Figure 1:
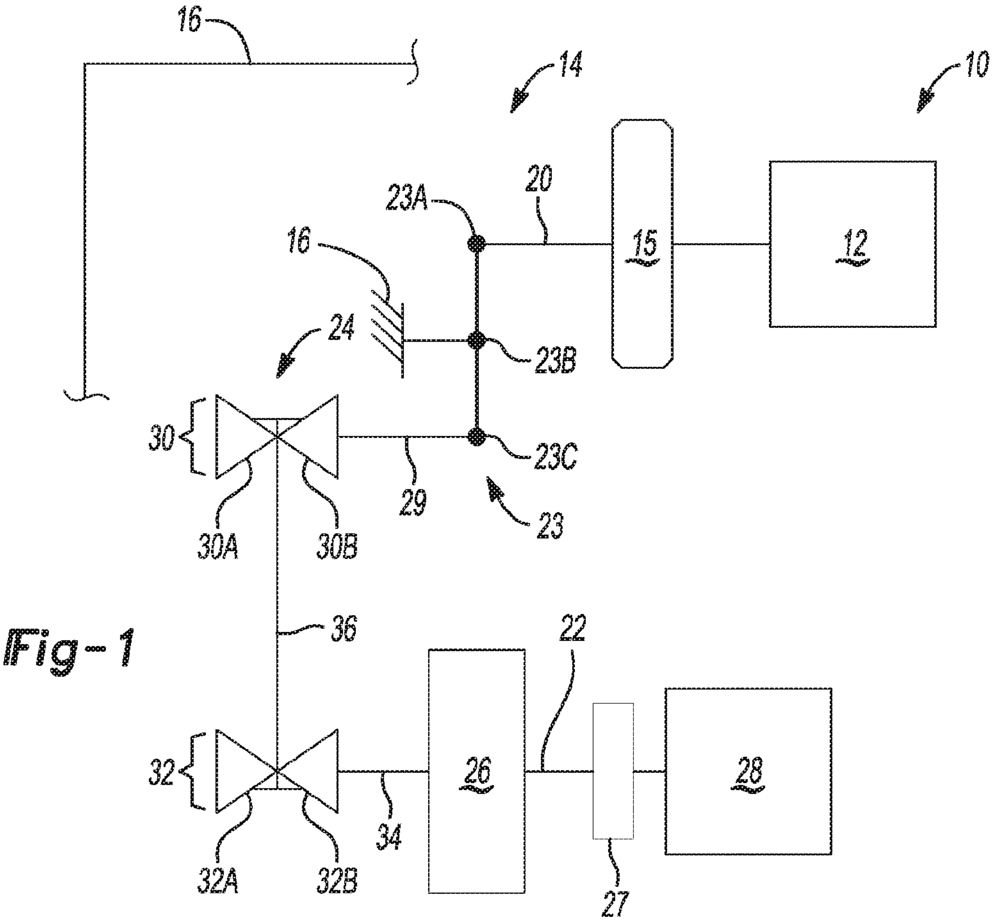
FIG. 1 is a schematic diagram of a powertrain according to the principles of the present invention.

With reference to FIG. 1, a powertrain for a motor vehicle is generally indicated by reference number 10. The powertrain 10 generally includes an engine 12 connected with a transmission 14. The engine 12 may be a conventional gasoline, Diesel, or flex fuel internal combustion engine, a hybrid engine, or an electric motor, or any other type of prime mover, without departing from the scope of the present disclosure. The engine 12 supplies a driving torque to the transmission 14 through, for example, a flexplate (not shown) or other connecting device or a starting device 15 such as a hydrodynamic device (torque converter) or launch clutch.

The transmission 14 is a variable diameter pulley or sheave drive continuously variable transmission (CVT). The transmission 14 includes a typically cast, metal housing 16 which encloses and protects the various components of the transmission 14. The housing 16 has a variety of apertures, passageways, shoulders and flanges which position and support these components. The transmission 14 includes a transmission input shaft 20 and a transmission output shaft 22. Connected between the transmission input shaft 20 and the transmission output shaft 22 is a speed change device 23, a pulley assembly or continuously variable unit 24, and a gearbox 26 that cooperate to provide forward and reverse speed or gear ratios between the transmission input shaft 20 and the transmission output shaft 22. The gearbox 26 and transmission 14 share, at least in some locations, the housing 16. The transmission input shaft 20 is functionally connected with the engine 12 and receives input torque or power from the engine 12 through the starting device 15. The transmission output shaft 22 is preferably connected with a final drive unit 28. The transmission output shaft 22 provides drive torque to the final drive unit 28. The final drive 28 unit may include a differential, axle shafts, and road wheels (not shown).

The transmission input shaft 20 is connected to the speed change device 23. In an alternate embodiment, the speed change device 23 is omitted from the transmission 14. The speed change device 23, as well as the various gearbox 26 arrangements described below, are illustrated in a lever diagram format. A lever diagram is a schematic representation of the components of a mechanical device such as meshing gear sets or planetary gear sets. Each individual lever represents a planetary gear set or meshed gear pair. The three basic mechanical components of the planetary gear are each represented by a node while the gear pairs are represented by a node and the rotation change represented by a node fixed to ground. Therefore, a single lever contains three nodes. In a planetary gear set, one node represents the sun gear, one the planet gear carrier, and one the ring gear. In a meshed gear pair, one node represents a first gear, one a second gear, and the third the rotational direction change between the meshed gears. In some cases, two levers may be combined into a single lever having more than three nodes (typically four nodes). For example, if two nodes on two different levers are connected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or connections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

For example, the speed change device 23 includes a first node 23A, a second node 23B, and a third node 23C. The first node 23A is coupled to the transmission input shaft 20. The second node 23B is fixed to ground representing a change in rotational direction. The third node 23C is coupled to a first transfer shaft or member 29 that is connected to the continuously variable unit 24. The first node 23A preferably represents a first gear while the third node 23C preferably represents a second gear meshed with the first gear. The gears may be co-planar or partially axially offset. The speed change device 23 may be an overdrive speed change device 23 that increases the speed of the first transfer shaft 29 relative to the transmission input shaft 20 while decreasing the torque. Alternatively, the speed change device 23 may be an underdrive speed change device 23 that decreases the speed of the first transfer shaft 29 relative to the transmission input shaft 20 while increasing torque. The speed change device 23 may also be a direct drive coupling member with no relative speed change.

The continuously variable unit 24 includes a first pulley or sheave pair 30 and a second pulley or sheave pair 32. The first pulley 30 includes a first truncated conical sheave or member 30A and second truncated conical sheave or member 30B in axial alignment with the first truncated conical sheave 30A. The second sheave 30B is directly connected for rotation with the first transfer member 29 and may be integrally formed with the first transfer member or shaft 29. The first sheave 30A is moveable axially relative to the second sheave 30B by a hydraulic control system (not shown) or other actuating system. It should be appreciated that the sheaves 30A and 30B may be axially switched without departing from the scope of the present invention.

The second pulley 32 includes a first truncated conical sheave or member 32A and second truncated conical sheave or member 32B in axial alignment with the first truncated conical sheave 32A. The second sheave 32B is directly connected for rotation with a second transfer shaft or member 34 or may be integrally formed with the second transfer shaft 34. The first sheave 32A is moveable axially relative to the second sheave 32B by a hydraulic control system (not shown) or other actuating system. It should be appreciated that the sheaves 32A and 32B may be axially switched without departing from the scope of the present invention.

A torque transmitting belt or chain or endless member 36 having a V-shaped cross section is mounted between the first pulley pair 30 and the second pulley pair 32. It should be appreciated that other types of belts, including positive engagement devices or non-V-shaped belts or chains, may be employed without departing from the scope of the present invention. Drive torque communicated from the transmission input shaft 20 is transferred via friction between the sheaves 30A and 30B and the belt 36. The ratio of the input pulley 30 to the output pulley 32 is adjusted by varying the spacing between the sheaves 30A and 30B and between the sheaves 32A and 32B. For example, to change the ratio between the pulleys 30 and 32, the axial distance between sheaves 30A and 30B may be reduced by moving sheave 30A towards sheave 30B while simultaneously the axial distance between sheave 32A and 32B may be increased by moving sheave 32A away from sheave 32B. Due to the V-shaped cross section of the belt 36, the belt 36 rides higher on the first pulley 30 and lower on the second pulley 32. Therefore the effective diameters of the pulleys 30 and 32 change, which in turn changes the overall gear ratio between the first pulley 30 and the second pulley 32. Since the radial distance between the pulleys 30 and 32 and the length of the belt 36 is constant, the movement of the sheaves 30A and 32A must occur simultaneously in order to maintain the proper amount of tension on the belt 36 to assure torque is transferred from the pulleys 30, 32 to the belt 36.

The continuously variable unit 24 transfers torque to the gearbox 26 via the second transfer shaft 34. The gearbox 26 transfers torque from the continuously variable unit 24 to the transmission output shaft 22. The transmission output shaft 22 transfers torque to a chain drive 27. The chain drive 27 transfers torque to the final drive unit 28.

Figure 2:
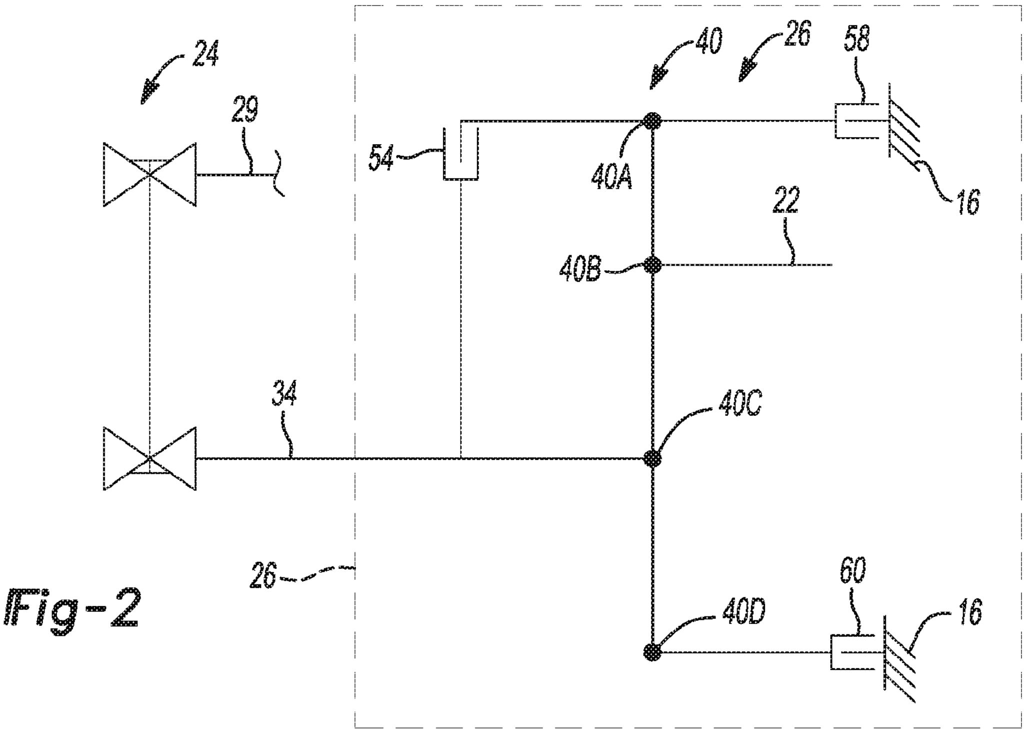
FIG. 2 is a lever diagram of an exemplary transmission according to the principles of the present invention.

Turning now to FIG. 2, the gearbox 26 is shown in lever diagram format. In one example of the present invention, the gearbox 26 includes a planetary gear set assembly 40. The planetary gear set assembly 40 may be a Ravigneaux style planetary gear set as described in detail below. The planetary gear set 40 includes four nodes: a first node 40A, a second node 40B, a third node 40C, and a fourth node 40D. Each of the nodes 40A, 40B, 40C, and 40D represent one or more of a sun gear member, planet carrier member, and ring gear member of the planetary gear assembly 40. Where one member of the planetary gear assembly 40 is coupled with another member of the planetary gear assembly 40, those two members are represented by a single one of the nodes 40A, 40B, 40C, and 40D.

The transfer shaft or member 34 is continuously coupled to node 40C. The transmission output shaft or member 22 is continuously coupled to node 40B. A clutch 54 selectively connects the node 40A with the second transfer shaft 34. A first brake 58 selectively connects the node 40A with a stationary member or the housing 16. A second brake 60 selectively connects the node 40D with another stationary member or the housing 16.

Turning now to FIG. 3, a diagram presents a schematic layout of the gearbox 26 according to the present invention. In FIG. 3, the numbering from the lever diagram of FIG. 2 is carried over. The clutches and couplings are correspondingly presented whereas the nodes of the planetary gear sets now appear as components of planetary gear sets, such as, sun gears, ring gears, planet gears and planet gear carriers.

For example, the planetary gear set 40 is a double planetary gear set having a forward sun gear member 40*c*, a rearward sun gear member 40*a*, a first set of planetary gears 70 (only one of which is shown), a second set of planetary gears 72 (only one of which is shown), a common carrier member 40*b*, and a ring gear member 40*d*. The common carrier member 40*b* supports the first and second planetary gears 70 and 72. The first set of planetary gears 70 are preferably stepped gears having a first stepped portion 70*a* and a second stepped portion 70*b*. Each of the first stepped portions 70*a* of the first set of planetary gears 70 are in mesh with the rearward sun gear member 40*a*. Each of the second stepped portions 70*b* of the first set of planetary gears 70 are in mesh with the ring gear member 40*d* and the second set of planetary gears 72. The second set of planetary gears 72 are each in mesh with the forward sun gear member 40*c*. In the example provided, the forward sun gear 40*c* is the gear closer to final drive 28 and the rearward sun gear 40*a* is the gear closer to the continuously variable unit 24.

Torque-transmitting mechanisms including clutch 54 and brakes 58 and 60 are provided to allow for selective connection of the shafts or connecting members, members of the planetary gear sets and the housing. The torque-transmitting mechanisms are friction, dog or synchronizer type mechanisms or the like. For example, the clutch 54 is selectively engageable to connect the forward sun gear 40*c* to the rearward sun gear 40*a* and the transfer member 34. The first brake 58 is selectively engageable to connect the rearward sun gear member 40*a* to or with the housing 16 in order to restrict the relative rotation of the rearward sun gear member 40*a*. The second brake 60 is selectively engageable to connect the ring gear member 40*d* to or with the housing 16 in order to restrict the relative rotation of the ring gear member 40*d*.

The gearbox 26 allows the CVT to operate in a high and low gear or speed mode and a reverse gear or speed mode. In the high gear the clutch 54 is engaged and transferring torque and brakes 58 and 60 are not engaged. In low gear, clutch 54 is not engaged, brake 58 is engaged and brake 60 is not engaged. In reverse, clutch 54 is not engaged, brake 58 is engaged and brake 60 is engaged.

In high speed mode, the torque is transferred from the input shaft 34 to the rearward sun gear member 40*a* and to the forward sun gear member 40*c* through clutch 54. Rearward sun gear member 40*a* drives the planetary gears 70 which in turn drives the common carrier 40*b* which is connected to output shaft 22. The first brake 58 and the second brake 60 are both not engaged and not carrying any torque.

In low speed mode, clutch 54 is not engaged, first brake 58 is engaged and second brake 60 is not engaged. The torque is transferred from input shaft 34 to forward sun gear 40*c* which drives the planetary gears set 72. The planetary gears 72 drive the common carrier 40*b* which is connected to the output shaft 22.

In reverse mode, clutch 54 is not engaged, first brake 58 is not engaged and second brake 60 is engaged. The torque is transferred from input shaft 34 to forward sun gear 40*c* which drives the planetary gears 72. However, the common ring gear 40*d* is braked by the second brake 60 thereby reversing the direction of rotation of the planetary gears 70 and 72 and thereby reversing direction of the of common carrier 40*b* and the output shaft 22.

The description of the invention is merely exemplary in nature and variations that do not depart from the gist of the invention are intended to be within the scope of the invention. Such variations are not to be regarded as a departure from the spirit and scope of the invention.

The following is claimed:

1. A continuously variable transmission comprising:

a transmission input shaft;

a speed change device connected to the transmission input shaft;

a continuously variable unit having a transfer shaft connected to the speed change device; and a gearbox comprising:

a housing;

an input member;

an output member;

the continuously variable unit connected to the input member;

a planetary gear set having a first member, a second member, a third member, and a fourth member, wherein the second member is connected to the output member and the third member is connected to the continuously variable unit;

a first torque transmitting mechanism selectively engageable to connect the third member of the planetary gear set to the first member of the planetary gear set;

a second torque transmitting mechanism selectively engageable to connect the first member of the planetary gear set with the housing; and a third torque transmitting mechanism selectively engageable to connect the fourth member of the planetary gear set to the housing, and wherein selective engagement of the first torque transmitting mechanism, the second torque transmitting mechanism, and the third torque transmitting mechanism provides a high speed mode of operation, a low speed mode of operation, and a reverse speed mode of operation to the continuously variable transmission;

wherein the first member is a rearward sun gear member, the second member is a carrier member, the third member is a forward sun gear member, and the fourth member is a ring gear member; and wherein the carrier member supports a set of stepped planetary gears and a set of non-stepped planetary gears, and wherein the set of stepped planetary gears each are in mesh with the rearward sun gear member, the ring gear member, and each of the non-stepped planetary gears, and wherein each of the non-stepped planetary gears are also in mesh with the forward sun gear member.

2. The continuously variable transmission of claim 1 wherein the rearward sun gear member is disposed axially along the transmission between the continuously variable unit and the forward sun gear member.

3. The continuously variable transmission of claim 1 wherein the stepped planetary gears each include a first stepped portion in mesh with the rearward sun gear member and a second stepped portion in mesh with the ring gear member and each of the non-stepped planetary gears.

4. The continuously variable transmission of claim 1 wherein the high speed mode is achieved by engaging the first torque transmitting mechanism and not engaging the second torque transmitting mechanism.

5. The continuously variable transmission of claim 1 wherein the low speed mode is achieved by not engaging the first torque transmitting mechanism and engaging the second torque transmitting mechanism.

6. The continuously variable transmission of claim 1 wherein the reverse mode is achieved by engaging the third torque transmitting mechanism, not engaging the first torque transmitting mechanism and not engaging the second torque transmitting mechanism.

7. The continuously variable transmission of claim 1 wherein the planetary gear set is a Ravigneaux style planetary gear set.

8. The continuously variable transmission of claim 1 wherein the speed change device comprises a pair of meshed gears configured to provide a fixed speed ratio between the transmission input shaft and the transfer shaft.

9. A continuously variable transmission comprising:

a transmission input shaft;

a speed change device connected to the transmission input shaft;

a continuously variable unit having a transfer shaft connected to the speed change device; and a gearbox comprising:

a housing;

an input member;

an output member;

the continuously variable unit connected with the input member;

a planetary gear set having a forward sun gear, a rearward sun gear, a carrier member, and a ring gear, wherein the carrier member supports a set of stepped planetary gears and a set of non-stepped planetary gears, and wherein the set of stepped planetary gears each are in mesh with the rearward sun gear, the ring gear, and each of the non-stepped planetary gears, and wherein each of the non-stepped planetary gears are also in mesh with the forward sun gear;

a first torque transmitting mechanism located between the continuously variable unit and the forward sun gear and selectively connecting the forward sun gear to the rearward sun gear;

a second torque transmitting mechanism selectively connecting the rearward sun gear to the housing; and a third torque transmitting mechanism selectively engageable to connect the ring gear of the planetary gear set to the housing, and wherein selective engagement of the first torque transmitting mechanism, the second torque transmitting mechanism, and the third torque transmitting mechanism provides a high speed mode of operation, a low speed mode of operation, and a reverse speed mode of operation to the continuously variable transmission.

10. The continuously variable transmission of claim 9 wherein the carrier member is connected to the output member.

11. The continuously variable transmission of claim 9 wherein the high speed mode is achieved by engaging the first torque transmitting mechanism and not engaging the second torque transmitting mechanism.

12. The continuously variable transmission of claim 9 wherein the low speed mode is achieved by not engaging the first torque transmitting mechanism and engaging the second torque transmitting mechanism.

13. The continuously variable transmission of claim 9 wherein the reverse mode is achieved by engaging the third torque transmitting mechanism, not engaging the first torque transmitting mechanism and not engaging the second torque transmitting mechanism.

14. The continuously variable transmission of claim 9 wherein the planetary gear set is a Ravigneaux style planetary gear set.

15. The continuously variable transmission of claim 9 wherein the speed change device comprises a pair of meshed gears configured to provide a fixed speed ratio between the transmission input shaft and the transfer shaft.

* * * * *